US007690398B2

(12) United States Patent
Kühbauch

(10) Patent No.: US 7,690,398 B2
(45) Date of Patent: Apr. 6, 2010

(54) ELECTROFLUIDIC CONTROL DEVICE

(75) Inventor: Heiko Kühbauch, Köngen (DE)

(73) Assignee: Festo AG & Co. KG, Esslingen (DE)

( * ) Notice: Subject to any disclaimer, the term of this patent is extended or adjusted under 35 U.S.C. 154(b) by 1046 days.

(21) Appl. No.: 11/375,899

(22) Filed: Mar. 15, 2006

(65) Prior Publication Data

US 2006/0240682 A1 Oct. 26, 2006

(30) Foreign Application Priority Data

Apr. 7, 2005 (EP) ................................ 05400012

(51) Int. Cl.
*F16K 11/00* (2006.01)

(52) U.S. Cl. ....................... 137/884; 137/861; 137/560

(58) Field of Classification Search ................. 137/861, 137/884, 560, 271; 439/1
See application file for complete search history.

(56) References Cited

U.S. PATENT DOCUMENTS

| | | | | |
|---|---|---|---|---|
| 3,358,210 | A * | 12/1967 | Grossoehme | 363/80 |
| 4,095,864 | A | 6/1978 | Hardin | |
| 5,519,636 | A * | 5/1996 | Stoll et al. | 700/282 |
| 6,216,738 | B1 * | 4/2001 | Ruckwied et al. | 137/884 |
| 6,216,740 | B1 * | 4/2001 | Hayashi et al. | 137/884 |
| 6,382,257 | B2 * | 5/2002 | Mead et al. | 137/884 |
| 6,427,723 | B2 * | 8/2002 | Bogdanowicz et al. | 137/884 |
| 6,513,547 | B2 * | 2/2003 | Endo et al. | 137/560 |

FOREIGN PATENT DOCUMENTS

| | | | |
|---|---|---|---|
| DE | 10304324 | A1 | 8/2004 |
| DE | 10316129 | A1 | 10/2004 |
| EP | 1081389 | A2 | 3/2001 |

* cited by examiner

*Primary Examiner*—John Rivell
*Assistant Examiner*—Christopher Pilling
(74) *Attorney, Agent, or Firm*—Hoffman & Baron, LLP

(57) ABSTRACT

An electrofluidic control device comprises a plurality of electrically operated power modules arranged at least in part in the form of control valves, said power modules being contacted by an concatenation strand. By way of a connection module and at least one additional feed module separate operating voltages may be supplied to the concatenation strand at mutually spaced points.

22 Claims, 4 Drawing Sheets

ELECTROFLUIDIC CONTROL DEVICE

CROSS-REFERENCE TO RELATED APPLICATION

This application claims priority based on European Application No. 05 400 012.0, filed on Apr. 7, 2005, which is incorporated herein by reference.

FIELD OF THE INVENTION

The invention relates to an electrofluidic control device comprising a plurality of electrically operable power modules arranged in a row direction and at least in part having at least one control valve, said power modules being jointly connected with an electrical concatenation strand extending in the row direction, by way of which strand control signals employed for the control of the power modules are communicated and by way of which strand the power modules are supplied with a first operating voltage, such first operating voltage being able to be supplied by way of a base connection provided on a connection module and connected with the concatenation strand.

BACKGROUND OF THE INVENTION

A known control device disclosed in the German patent publication 103 04 324 A1 of this type comprises a distributor fitted on a control module, said distributor being fitted with power modules in the form of electrically operable control valves and comprising a modularly designed electrical concatenation strand, which connects the drives of the control valves with the control module. The concatenation strand serves to communicate the control signals responsible for the actuation pattern of the control valves to the electrical drives of the control valves. The concatenation strand may be employed also for the application of the operating voltage necessary for the operation of the valve drives.

A control device with a similar design is also described in the German patent publication 103 16 129 A1.

Owing to the energy requirement necessary for the actuation of the control valves the control device may only be fitted with a restricted number of power modules. If it is a question of power modules requiring a particularly high actuating power, and for instance proportional valve, the design of the control device is even further restricted. To implement complex control tasks it is consequently extremely frequently necessary to provide for the parallel use of several control devices, involving a correspondingly heavy financial expenditure, because as a rule a separate electronic control module is required in each case.

SUMMARY OF THE INVENTION

One object of the invention is to suggest measures which render possible a more effective application of control devices of the type initially mentioned.

In order to achieve these and/or other objects appearing from the present specification, claims and drawings, in the present invention for the feed of at least one further operating voltage there is in addition to the connection module at least one feed module having an electrical feed connection, such feed module being able to be included or being included in the concatenation strand and spaced from the connection module.

It is in this manner that there is the possibility of feeding a respective operating voltage in the concatenation strand at spaced apart points. Each operating voltage may in this case be held at a level compatible with the conductor cross sections and may nevertheless make available an adequate operating voltage for a practically unlimited number of power modules. The design possibilities as regards the control device are in this case far greater than in the prior art, it being possible in many cases, in which hitherto several control device had to be employed simultaneously, to make do with a single control device with a correspondingly more developed design.

The number of the feed modules employed is practically unlimited. The distances apart of the sequentially following feed modules will be so selected that the voltage drop, occurring in the intermediate length section of the concatenation strand, and the maximum energy requirement is compensated for.

In principle it would be possible to apply the different operating voltages to the same conductor of the concatenation strand. Then it would be a question of a true parallel circuit connection at spaced apart feed points. However, as a substantially more advantageous design it is possible for the connection module and the at least one feed module to be associated with galvanically separate operating voltage zones of the concatenation strand. Accordingly the connected power modules are at potentials which are galvanically completely separate. Trouble conditions possibly occurring in one of the operating voltage zones can then not have a disadvantageous effect on the operation of the power modules associated with the operating voltage zones. There is also the possibility of operation within the individual operating voltage zones with different levels of operating voltages in order for instance to be able to operate power modules departing from the standard.

With the separate operating voltage zones there is moreover the possibility, for example in an emergency, of disconnecting individual valve groups from the operating voltage and preventing further operation thereof.

It is more especially advantageous in this connection for an installed feed module not to cause any interruption in the control conductors present in the concatenation strand, and/or supply lines, despite the potential separation as regards the operating voltage, such control conductors and/or supply lines serving for the transmission of the control signals and the supply of energy to the local electronic control circuitry and/or sensor circuitry. This ensures that the power modules assigned to a operating voltage zone, which is not put out of operation, and any electronic control circuitry and/or sensor circuitry (possibly assigned to power modules) may continue to be employed without limitation.

A connection, which is in principle continuous, may be present for operating voltage conductors able to be supplied to a operating voltage, which is only interrupted on a case to case basis for potential separation for the installation of a feed module. There is also the possibility of providing an interruption of all concatenation strand conductors at feed zones which are intended for the inclusion of a feed module when a feed module is not installed, for the switching of a feed module. The feed module is then so designed that in the installed state it performs the potential separation as regards the operating voltage conductors and as regards the other conductors produces such a simply looped through connection.

The connection module with its basis connection may have a self-contained structure. More particularly for the sake of having a high degree of modularity and the economic use of identical parts the connection module with its basis connection may however have the same design as the feed module designed with a feed connection.

In conjunction with power modules designed in the form of control valve in the case of the multiply feed operating voltage it is a question of the actuating voltage serving for the actuation of the respective valve drive. The valve drive may, as the drive unit, for example have one or more magnet coils or piezoelectric actuators.

If the concatenation strand also serves to provide locally present electronic control circuitry and/or sensor instrumentalities with the necessary supply energy, it is for this purpose connected more particularly with a separate electrical supply connection. Simultaneously by way of this supply connection, if required, electrical output of the control device may be supplied.

The signals employed for the control of the power modules are preferably generated in a bus station of the control device, which is a component of an electronic control module. Starting at this control module the control signals may be either passed on in a 1:1 connection to the power modules or communicated in serial bus technology—for example with a so-called C-bus or profibus—to the diverse power modules, the latter necessitating local electronic control circuitry associated with the power modules. Each control module may have its own electronic control circuitry. As an alternative several power modules may be controlled by way of common electronic control circuitry.

The electronic control module may be so designed that it simultaneously constitutes one or, respectively, the connection module. Accordingly as a rule it is possible to do without a separate connection module.

A particularly compact design is possible, if at least one feed module is directly constituted by a suitably designed power module that possesses a suitable feed connection.

In the case of a particularly advantageous form of the design the electrical conductors, termed the concatenation conductors, of the concatenation strand lie opposite to each other in pairs in at least one feed zone, provided for the putting in circuit of a feed module, with resilient electrical contact sections. The feed module possesses a contact part, which is connected with its feed connection and which fits in between the oppositely placed contact sections and connects same from each other together in accordance with purpose of use of the associated concatenation conductor or separates same for the purpose of having a galvanically separate energy supply.

Preferably the contacting part comprises a support board, fitted with the necessary contact making means, which is fixed to the housing of the respective feed module. The connection with the concatenation strand is preferably produced automatically in this case, when the feed module is mounted on a mounting face of the control device.

Further advantageous developments and convenient forms of the invention will be understood from the following detailed descriptive disclosure of one embodiment thereof in conjunction with the accompanying drawings.

DETAILED DESCRIPTION OF THE PREFERRED EMBODIMENTS

Figure 1:
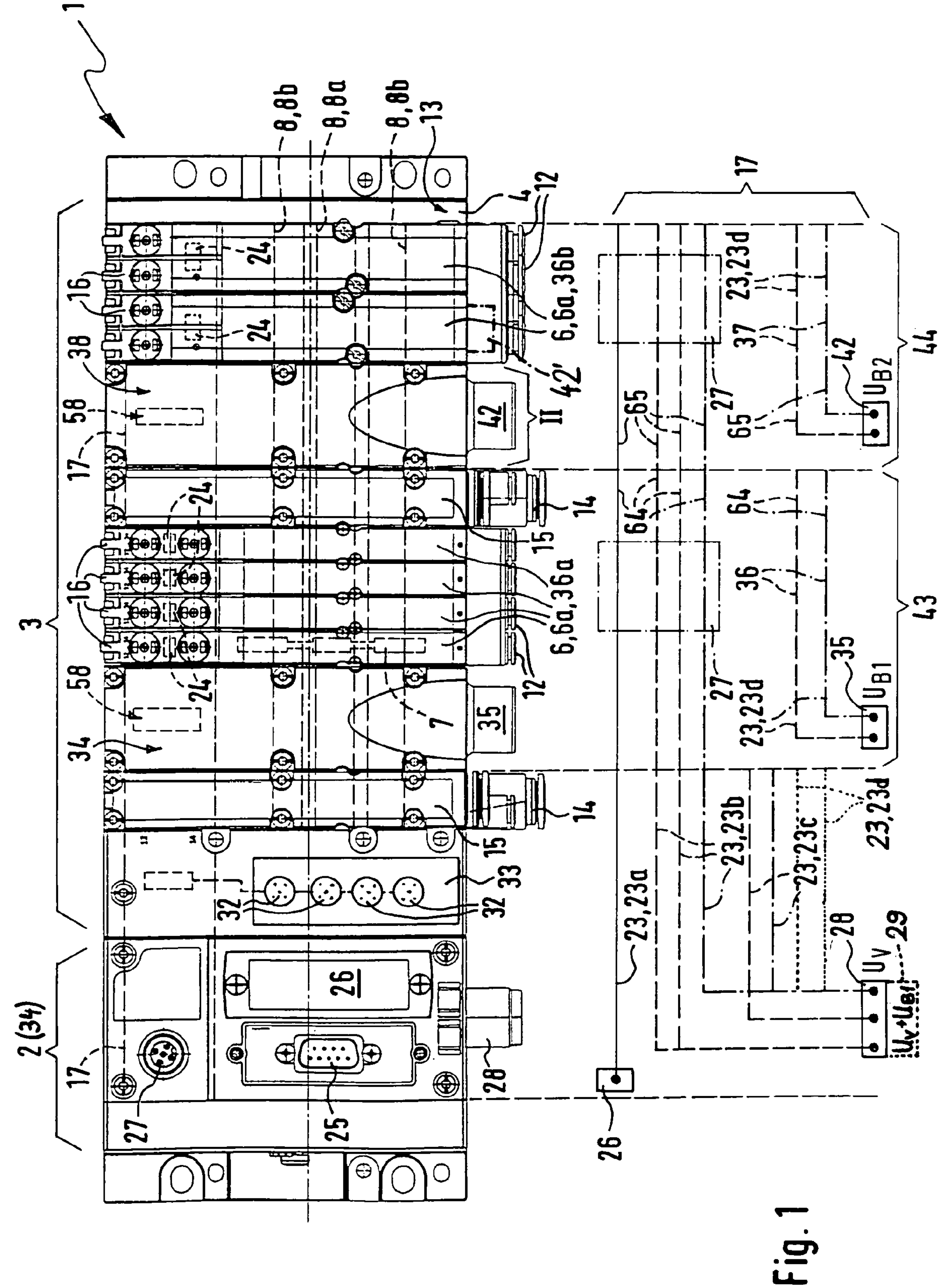
FIG. 1 shows a preferred embodiment of the electrofluidic control device in a plan view, the integrated concatenation strand being illustrated separately as well.

FIG. 1 depicts an electrofluidic control device 1 in its totality, which possesses an electronic control module 2 mounted on one face of a power unit 3 designed as a subassembly.

Figure 2:
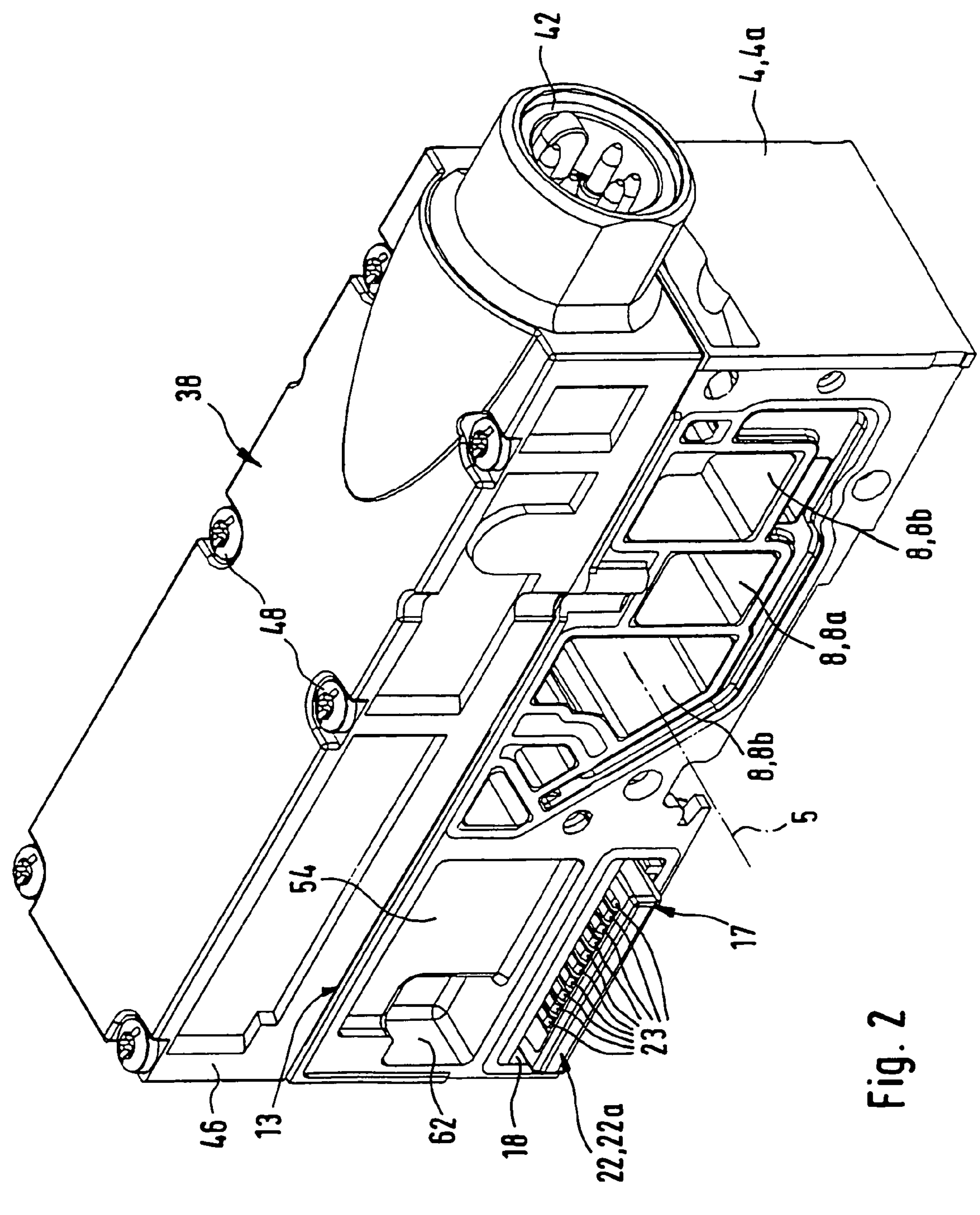
FIG. 2 shows the portion marked II in FIG. 1 in a larger perspective elevation, a feed module being visible which is installed on a distributor.

The power unit 3 possesses a bar- or plate-like distributor 4, which is composed of a plurality of distributor segments 4*a* arranged in the direction of a row axis 5 in sequence. FIG. 2 shows such a distributor segment 4*a* in a separate elevation.

The distributor i is flange-mounted on the control device 1. On its top side facing the reader in FIG. 1 a plurality of device components are detachably fitted. Such device components include a plurality of electrically operated power modules 6 which at least partly have an electrically operable control valve 6*a* for fluid currents. In the working embodiment the power modules 6 are respectively all constituted by such a control valve 6*a*.

Each control valve 6*a* has at least one adjustable valve member 7 setting in a manner dependent on its switching settings, different fluid routes between distributor ducts 8 extending in the distributor 4 and load connections 12 provided laterally on the distributor 4. The latter are suitable for the connection of fluid lines leading to loads to be served, as for example fluid operated drive.

The connection of the distributor ducts 8 and the load connections 12 with the control valves 6*a* is ensured by connecting ducts, not illustrated in detail, which open at the mounting face 13, bearing the control valves 6*a*, of the distributor 4 and are connected with valve ducts extending in the respective control valve 6*a*.

The distributor ducts 8 comprise at least one feed duct 8*a* which is connected with one or more fluid feed connections 14 arranged on an outer face of the distributor 4. In this case fluid employed for the operation of the control device 1 may be supplied using fluid ducts, not illustrated, such fluid being more especially compressed air, another gas or however a hydraulic medium.

Two further distributor ducts 8 are designed as venting ducts 8*b* and open in vent modules 15 seated on the mounting face 13, by way of which vent modules compressed air returning from the loads is taken in or may be discharged by way of mufflers.

Each control valve 6*a* possesses an electrically actuated valve drives 16. Dependent on the design of the control valve 6*a* such drive 16 may operate the valve member 7 directly or—as in the working example—be in the form of a pilot control valve with electrical actuating or servo means. The electrical actuating means will for example comprise one or more electromagnets.

The power modules 6 are placed on the face 13 following each other in sequence in the row axis 5. In this case they may be collected together in individual valve groups.

For electrical operation all control valves 6*a* are jointly connected with an electrical concatenation strand 17 extending in the row direction 5. Such strand extends past all control valves 6*a* adjacent to their respective drive 16 which is electrically contacted by way of interface means, not illustrated in detail, for detachable connection with the concatenation strand 17.

In the working embodiment the electrical concatenation strand 17 extends starting at the electronic control module 7 in a concatenation duct 18 running through the distributor 4 in the longitudinal direction. At the individual valve drives 16 the concatenation strand 18 is open to the mounting face 13 and accordingly renders possible access for the above mentioned electrical interface means.

In the working embodiment illustrated the concatenation strand 17 is composed of individual concatenation modules 22 arranged in sequence adjacent to each other, which are connected mechanically and electrically with one another. The modular structure renders possible the production of practically any desired overall length of the concatenation strand 17 to adapt it to the respective design of the control device 1 as regards fluid power technology.

The electrical concatenation strand 17 comprises a plurality of electrical conductors extending in the longitudinal direction of the strand, such conductors being termed concatenation conductors 23. Same serve for different purposes, which will be described in the following in detail.

Some of the concatenation conductors 23 are control conductors 23*a*, which constitute an internal serial bus, by way of which, starting at the electronic control module 2, control signals may be communicated to the power modules 6, which set the actuation pattern of the power modules 6, that is to say for example the sequence of actuation and the duration of activation.

However simultaneously the control lines or conductors 23*a* may serve for feedback of diagnostic signals from sensor circuitry 24, separate from or assigned to the power modules 6, to the electronic control module 2. The diagnostic signals are for example pressure or switching setting signals converted into electrical signals.

The electronic control module 2 possesses at least one field bus connection 25 via which it can be connected with an electronic master control device. Preferably in the electronic control module 2 itself there is an internal bus station 26, which converts the signals from the electronic means into control signals for the internal bus and vice versa. Preferably as well the electronic control module 2 is also fitted with a microprocessor, not illustrated in detail, by way of which an internal control program may be implemented for the control of the power modules 6, either in a self-contained manner or in coordination with the master control device. An interface serving for external programming and possibly monitoring and visualization is indicated at 27.

In conjunction with the serial signal transmission the individual power modules 6 are each locally associated with electronic control circuitry 27, which performs, in accordance with the effective addressing, a correctly correlated reading and distribution of the control signals. Each power module 6 may have its own electronic control circuitry associated with it which is then preferably integrated in the respective power module 6. In the working embodiment the individual electronic control circuitry 27 is in each case responsible for groups of power modules 6 and therefore in the form of separate components. They are preferably placed between the power modules 6 and the control conductors 23*a* of the concatenation module 22. In the working embodiment same are below the valve drives 16.

The supply voltage $U_V$ necessary for the operation of the electronic control circuitry 27 and the sensor circuitry 24 is also applied by way of the electrical concatenation strand 17. The strand comprises supply conductors 23*b*, suitable for this purpose, to which the supply voltage $U_V$ is fed by way of a supply connection 28 best arranged on the electronic control module 2. The supply leads 23*b*, indicated in stranded lines are to represent the separated plus conductors for on the one hand the electronic control circuitry 27 and on the other hand the sensor circuitry 24. A common ground conductor of the supply conductors 23*b* is represented in stranded lines.

The supply leads 23*b* extend like the control lines 23*a* without interruption along the full length of the concatenation strand 17.

Furthermore the plus pole and the minus pole of further supply leads 23*c* of the concatenation strand 17 are connected with the supply connection 28 and by way of lines 23*c* the separate electrical outputs 32 are supplied. Same may in principle be placed at any position on the control device 1 and are preferably a component of an output module 33 able to be coupled with the electrical concatenation strand 17. In the working embodiment such output module 33 is located to be directly connected with the control module 2 so that the further supply lines 23*c* may terminate in this portion and do not have to be trained along the entire concatenation strand 17. In principle however the latter possibility might also be adopted.

In the case of supply voltage $U_V$ supplied to the supply leads 23 and 23*c* it is preferably a question of a regulated voltage. The supply voltage is a regulated voltage and the actuating voltage is an unregulated voltage. A voltage suitable for the components amounts to 24 volts.

The electrical concatenation strand 17 furthermore serves to supply the power modules 6 with the operating voltage $U_B$ necessary for their operation. Here it is a question of a voltage separate from the supply voltage $U_V$, which is normally employed more especially for such activities of the power modules 6, involve a heavy energy requirement. In the working embodiment for example the operating voltage $U_B$ serves as an actuating voltage for the actuation of the drives 16 of the control valves 6*a*, which is controlled individually by the control signals supplied by way of control lines 23*a*.

For the supply with the operating voltage $U_B$ the electrical concatenation strand 17 comprises operating voltage lines 23*d* in the form of a plus pole (indicated in strand-dot lines) and a ground conductor (indicated in stranded lines) and which run in the longitudinal direction of the concatenation strand 17 and extend past the power modules 6 to be supplied.

A particular advantage for operation of the control device 1 results from taking steps rendering possible feed of the operating voltage $U_B$ to the concatenation strand 17*a* at spaced apart positions on the concatenation strand 17 in its direction of extent. Accordingly it is not necessary for all power modules 6 to be supplied with the same operating voltage.

The control device 1 of the working embodiment has, for the supply of a first operating voltage $U_{B1}$, a connection module 34 with a base connection 35 which renders possible the application of the voltage. The base connection or terminal 35 is electrically connected with a first section 36 of the operating voltage lines 23*d*, such section extending along the concatenation strand 17 and having voltage tapped from it by a first group 16*a* of power modules 6.

A second section 37 (forming an extension of the first strand section 35) of the operating voltage lines 23 is tapped by a second group 36*b* of power modules 6 and is supplied by way of feed module 348 (which is separate from the connection module 34) with a second operating voltage $U_{B2}$. For the supply of such operating voltage $U_{B2}$ to the feed module 38 the latter is fitted with an electrical feed connection 42, which like the base connection 35 and preferably the supply connection 28 as well is more especially in the form of a plug connection also.

The feed module 38 is, in the longitudinal direction of the concatenation strand 17, spaced from the connection module 34 and placed at some point along the length of the concatenation strand 17 and is exclusively connected with the second strand section 37 of the operating voltage conductors 23*d*. This second strand section 37 is galvanically separated from the first strand section 36, which is connected with the connection module 34. The result is then two sequentially placed separated operating voltage zones 43 and 44 which are separate from each other as regards supply with their operating voltage $U_B$.

Accordingly there is a grouped supply of the power modules 6 with separate operating voltages, something which inter alia renders possible the supply of the necessary electrical power even in the case of a heavy energy requirement of individual modules 6.

While in the working embodiment owing to the use of a feed module 38 two separate operating voltage zones 43 and 44 are formed, it will be clear that the number of operating voltage zones may be increased in principle by the installation of one or more further feed modules 38 to any desired extent. The substantially lower energy requirement of any electrical control circuitry 27 present and/or sensor circuitry 24 can on the contrary be provided by way of a single supply connection 28 with practically any desired overall length. The extent of the supply lines 23*b* is hence, independent of the use of the feed modules 38, continuous and uninterrupted along the full length of the concatenation strand 17.

Since furthermore the continuous extent of the control lines 23*a* is not influenced by the respective feed module 38, there is the possibility of switching operating voltages and accordingly the corresponding operating voltage zones 43 and 44 to zero voltage without affecting the functionality of the electrical concatenation as regards the control lines 23*a* and the supply lines 23*b*. More particularly in connection with an emergency it is therefore possible to turn off the power to one or more operating voltage zones and accordingly deactivate the associated power modules 6 without impairing the functionality of the power modules associated with the other operating voltage zones. To this extent there are additional advantages in the case of such a design as compared with a design in which the sequentially placed strand sections 36 and 37 are connected together despite the feed module 38 being included, with the consequence that the design only benefits from the purely parallel circuiting of the individual operating voltage.

The potential separation present in the working example also yields the advantage that it is possible to operate with different levels of the operating voltage in the operating voltage zones 43 and 44 produced. This renders possible, for example, simultaneous operation of the power modules 6 with different power requirements in one and the same control device 1.

In the working embodiment the connection module 34 provided with the base connection 35 has the same structure as the feed module 38 and more especially is installed in the same fashion as the feed module 38 on the control device 1.

Both modules 34 and 38 are alternatingly mounted with groups of power modules 6 in the row direction 5 on the mounting face 13 of the distributor 4.

As an alternative to the illustrated design the connection module 34 may also be an integral component of the electronic control module 2, or expressed differently, the electronic control module 2 may simultaneously constitute the connection module 34. The connection module 34 depicted in FIG. 1 as a component of the power unit may if desired be left out in this case. To explain this design better the reference numeral 34 in parentheses, referring to the optional functionality as a connection module is inserted in FIG. 1 with reference to the electronic control module 2.

More particularly in the case of the above mention design the electronic control module 2 also has the operating voltage conductors 23*d*, belonging to the concatenation strand 17, as is indicated by dots in FIG. 1. For the feed of the voltage control module 2 could in this case be provided with mutually separate supply and base connections. It is particularly advantageous in such a case however for the supplied connection to be combined with the base connection in a common connection means 29 on the electronic control module 2 in order to be able to supply the supply voltage $U_V$ and the first operating voltage $U_{B1}$ by way of such common connection means 29 to the concatenation strand 17. This design feature is indicated by dots in FIG. 1 as well.

If the distributor 4 and 4*a* is segmented in its structure, as is the case with the working example, the connection module and/or the feed module may also itself directly comprise a distributor segment 4*a* adapted to the shape of the distributor 4. The above mentioned components may in this case all be collected together as a single easily fitted structural unit.

Figure 3:
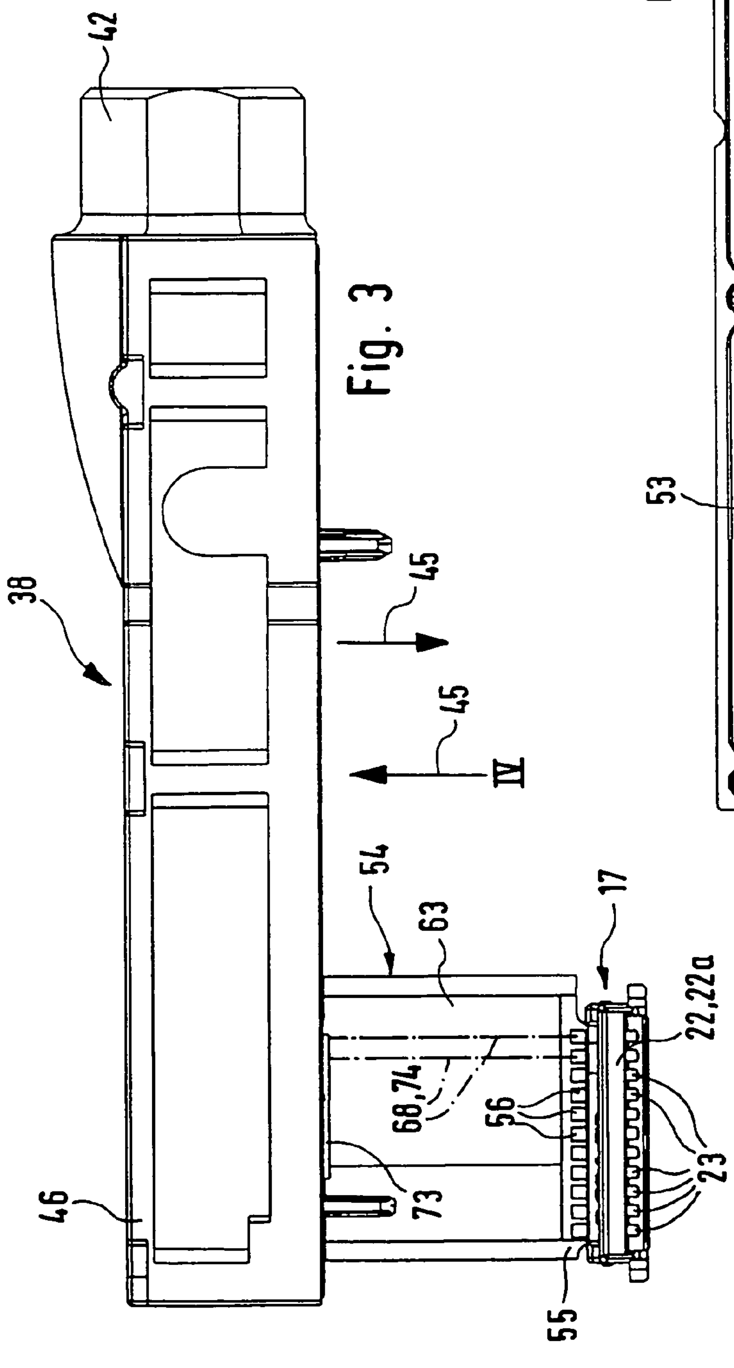
FIG. 3 shows the feed module of FIG. 2 in a separate side view coupled with the concatenation strand.
Figure 4:
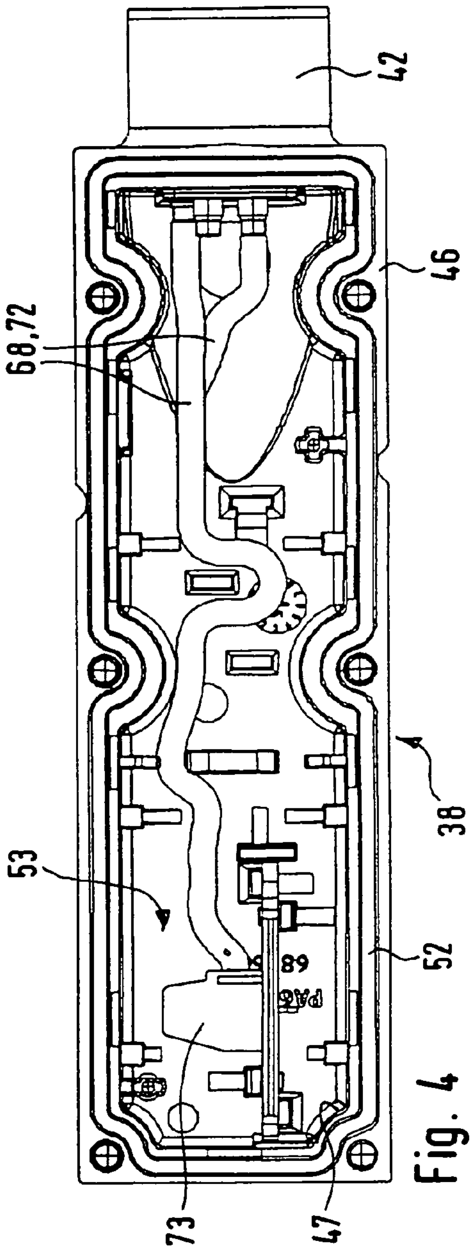
FIG. 4 depicts the feed module in a view from below looking in the direction of the arrow IV in FIG. 3.

The feed module 38 again illustrated separately in FIGS. 3 and 4 is preferably so designed that it is able to be placed in an assembly direction 45, perpendicular to the mounting face 13, on a fitting area, provided therefor, on the mounting face 13. It possesses an elongated configuration, its longitudinal axis being aligned, like that of the connection modules 6, at a right angle to the row axis 5.

The feed module 38 possesses an elongated housing 46 which bears the feed connection 42. The latter is best located on one of the housing end faces. The module housing 46 is preferably designed like a hood and fitted on the mounting face 13 with its opening 47 (due to having the hood configuration) to the fore. Attachment is more especially performed using a screw connection, attachment screws 48 (which extend through the module housing 46 in the edge part) being able to be detachably inserted into the distributor 4 lying underneath. In the fitted condition the housing opening 47 is covered by the distributor 4. A seal 52 extending along the edge of the housing opening 47 prevents the ingress of dirt into the internal space 53 of the module housing 46.

Figure 5:
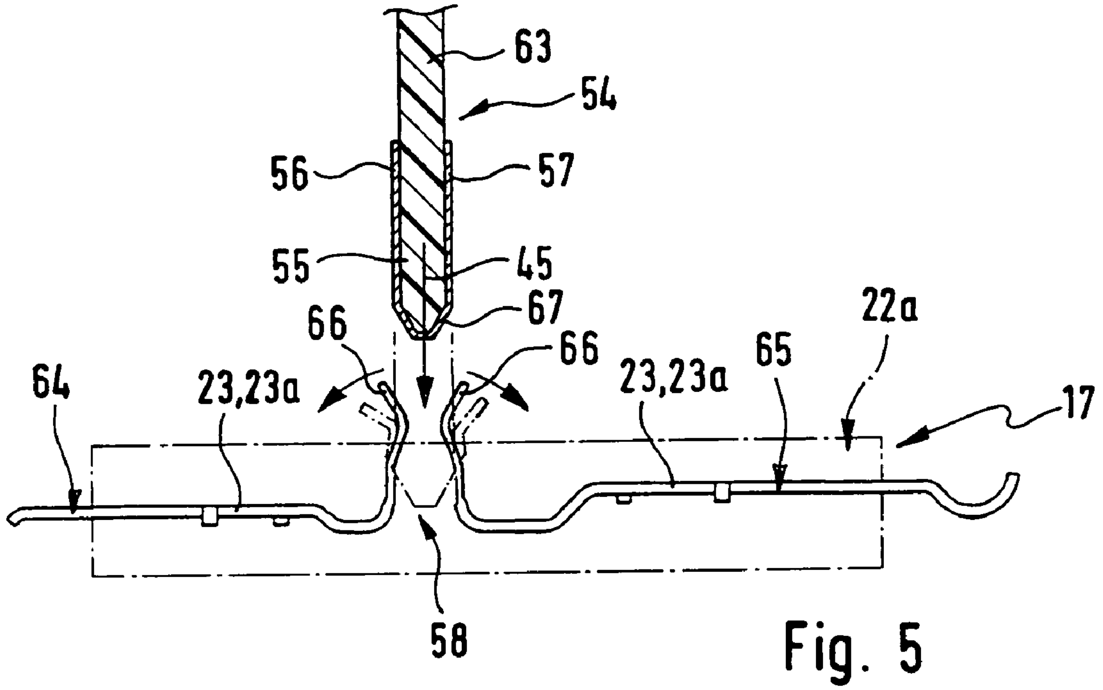
FIG. 5 shows in simplified fashion a section of the concatenation strand in a feed zone for the operating voltage, the bottom end section of a contacting part, belonging to the feed module, being illustrated prior to joining with the concatenation strand, partly in section.
Figure 6:
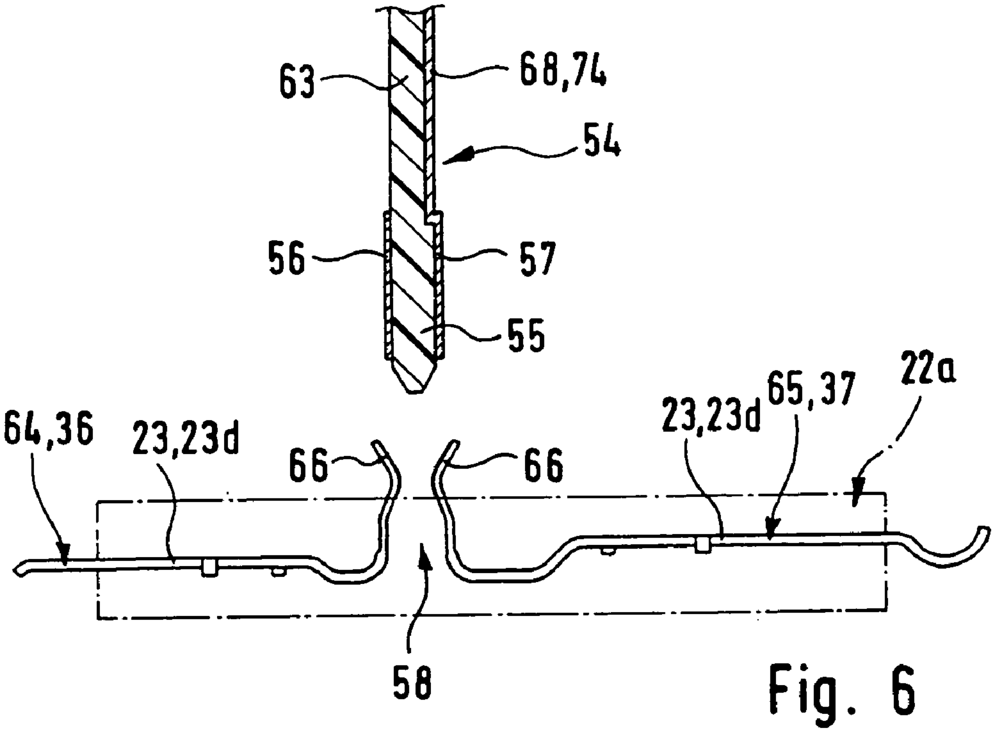
FIG. 6 depicts the arrangement of FIG. 5 in a different section plane of the contacting part.

In the interior of the module housing 46 a contacting part 54 outwardly protruding through the housing opening 47 is secured. The bottom end portion 55, opposite to the module housing 46, of the contacting part 54 is visible in FIGS. 5 and 6.

The contacting part 54 is plate-like in shape, the plane of its plate extending at a right angle to that of the concatenation strand 17. At its bottom end portion 55 the contacting part 54 is provided with a plurality of contacting faces 56 and 57 which make contact with the concatenation conductors 23 in a feed zone 58, when the feed module 38 is being mounted on the mounting face 13. The contacting part here fits through the a vertical passage 62 in the distributor which opens at the top at the mounting face 13 and at the bottom into the concatenation duct 18.

The contact faces 56 and 57 are provided on mutually opposite plate sides of the contacting part 54. The one set of contact faces 56 is therefore turned in the one direction along the concatenation strand 17 and the other set 57 faces in the other direction of the strand.

It is preferred for the contacting part 54 to comprise a self-supporting carrier board 63 on which the contact making faces 56 and 57 are provided.

In the feed zone 28 portion the concatenation conductors 23 are divided up into sequentially following strand sections 64 and 65. Such strand sections 64 and 65 furthermore include the first and the second strand sections 36 and 37 of the operating voltage conductors 23*d*. Resilient electrical contact making sections 66, which are spaced apart and are arranged respectively opposite to each other in pairs, of the strand sections 64 and 65 terminate in the feed zone 58. When the feed module 38 is not fitted in position the distance apart between the mutually opposite resilient contact sections 66 is less than the distance between the contact making faces 56 and 57 of a respective contact making pair 54.

During installation the bottom end portion 57 (having the contact making faces 56 and 57) of the contact making part 54 is fitted between the resilient contact sections 66, the resilient contact sections 66 being shifted by a respective contact making face 56 and 57 and thrust apart. They are then braced against respectively associated contact face 56 and 57, as is indicated in strand-dotted lines in FIG. 1.

Owing to the inserted contact portion 54 those strand sections 64 and 65, which belong to the control lines 23*a* and the supply lines 23*b*, are simply looped through so that right past the feed zone 58 there is an uninterrupted electrical connection within such conductors. The looping through is produced because those contact faces 56 and 57, which rest against the strand sections 64 and 65 to be connected, are electrically connected with one another. In the working embodiment this is made possible according to FIG. 5 because the corresponding contact faces 56 and 57 are provided on U-like connecting conductors 67 which are trained around the bottom edge of the carrier board 63.

In contradistinction to this the first and the second strand sections 36 and 37 of the operating voltage conductors 23*d* are electrically separated by the inserted contact making part 54. The associated contact faces 56 and 57 are hence electrically insulated from each other and prevent electrical contact being made between resilient contact sections 66 lying on them.

Here the contact faces 57 engaging the contact sections 66 of the second strand section 37 (see FIG. 6) serve for the supply of the operating voltage to the operating voltage zone 44 belonging to the second strand section 37. For this purpose the respective contact faces 57 are connected by way of electrical conductors 68 with the electrical feed connection 42.

In the working embodiment such electrical conductors 68 are partially in the form of flexible cables 72 extending in the interior space 53 between the feed connection 42 and an electromechanical interface 73 seated on the carrier board 63. Starting at the latter printed wiring or wire conductors 74 run on or in the carrier board 63 to the contact faces 57 with which contact is to be made.

The contact making faces 56 facing the strand section 36 serve as simple connection faces and as an abutment for the associated contact sections 66. They could theoretically be dispensed with, because they do not serve for the supply of energy.

If the concatenation strand 17 is of modular design the concatenation modules 22 employed, able to be contacted for example by plugging them together, could in principle be of standardized construction, a feed concatenation module 22*a* being included in the series of standardized concatenation modules 22 for the purpose of feed of voltage. This renders possible practically any desired placement of the position of electrical feed.

Finally it is to be borne in mind that at least one feed module 38 may also be directly constituted by a suitably designed power module 6. For instance, a power module, comprising at least one control valve 6*a*, can also have an electrical feed connection 42', indicated in FIG. 1 in strand-dotted lines and associated circuitry for making electrical contact with the concatenation strand 17.

What is claimed is:

1. An electrofluidic control device comprising a plurality of electrically operable power modules arranged in a row direction and at least in part having at least one control valve, said power modules being jointly connected with an electrical concatenation strand extending in the row direction, wherein via said concatenation strand control signals employed for the control of the power modules are communicated and wherein via said concatenation strand the power modules are supplied with a first operating voltage, said first operating voltage being able to be supplied by way of a base connection provided on a connection module and connected with the concatenation strand, wherein for feeding of at least one further operating voltage there is in addition to the connection module at least one feed module having an electrical feed connection, said feed module being included or being able to be included in the course of the concatenation strand at a position spaced from the connection module, said electrical feed connection being externally accessible when said power modules are jointly connected with said electrical concatenation strand, the connection module and the at least one feed module being coordinated with galvanically separated operating voltage zones of the concatenation strand.

2. The control device as set forth in claim 1, comprising several feed modules included or able to be included in the course of the concatenation strand separately from each other.

3. The control device as set forth in claim 1, wherein the connection module with its base connection has the same structure as the feed module with its feed connection.

4. The control device as set forth in claim 1, wherein the concatenation strand possesses conductors, which are continuous and non-interrupted irrespectively of the presence of the at least one electrical feed module, said conductors being in the form of at least one of control conductors in contact with the power modules, supply conductors for the supply of energy to at least one electronic control circuitry, and supply conductors for the supply of energy to sensor circuitry associated with the power modules.

5. The control device as set forth in claim 1, wherein when the power modules are in the form of control valves the multiply feedable operating voltage is an actuating voltage serving for the actuation of the valve drive of each respective control valve.

6. The control device as set forth in claim 1, wherein the power modules at least partly have at least one of electronic control circuitry and sensor circuitry locally associated with them, the supply voltage of same being supplied by way of the concatenation strand uninfluenced by the at least one feed module.

7. The control device as set forth in claim 6, wherein for the feed of the supply voltage necessary for the operation of at least one of local electronic control circuitry and sensor circuitry the concatenation strand is connected with an electrical supply connection.

8. The control device as set forth in claim 7, comprising electrical outputs which are connected by way of the concatenation strand with the supply connection as well.

9. The control device as set forth in claim 6, wherein the supply voltage is a regulated voltage and the actuating voltage is an unregulated voltage.

10. The control device as set forth in claim 1, comprising an electronic control module, connected with the concatenation strand, for the output of the control signals.

11. The control device as set forth in claim 10, wherein the electronic control module also constitutes said connection module.

12. The control device as set forth in claim 11, wherein the electronic control module is adapted for the feed of both an operating voltage and also a supply voltage.

13. The control device as set forth in claim 12, wherein the electronic control module comprises a common connection means for the feed of both an operating voltage and a supply voltage.

14. The control device as set forth in claim 10, comprising a power unit which is mounted on the electronic control module, said power unit being in the form of an assembly group which comprises the power modules and within which said concatenation strand is extending.

15. The control device as set forth in claim 1, wherein at least one feed module is directly constituted by a power module provided with a feed connection.

16. The control device as set forth in claim 1, comprising means for serial transmission of the control signals by way of the electrical concatenation strand.

17. The control device as set forth in claim 1, wherein electrical concatenation conductors associated with the concatenation strand have resilient electrical contact sections which are opposite to each other in pairs in at least one feed zone provided for the insertion of a feed module, said feed module having a contact making part connected electrically with the feed connection and, when the feed module is installed, fitting between the contact sections thereby holding same in accordance with the purpose of use of the associated concatenation conductors either joined in pairs or holding same separated and at the same time connecting one of the respectively separated contact sections with the feed connection.

18. The control device as set forth in claim 17, wherein the contact making part possesses a carrier board which at an end section, which is able to be plugged between the contact sections, is provided on opposite sides with contact making faces serving for contacting the contact sections, said contact faces being partly connected together for looping through a concatenation conductor and partly being connected with the feed connection for the feed of an electric operating voltage.

19. The control device as set forth in claim 1, comprising a distributor fitted with the power modules and with the at least one feed module, said distributor including, in a mutually parallel array, the electrical concatenation strand and a plurality of distributor channels communicating with at least one power module.

20. The control device as set forth in claim 19, wherein the at least one feed module is mounted, aligned in a row with the power modules, on a component mounting face of the distributor, said mounting being made in particular in a detachable manner.

21. The control device as set forth in claim 20, wherein the feed module has a hood-shaped module housing carrying the feed connection, said hood-shaped module housing defining an opening facing the distributor.

22. An electrofluidic control device comprising a plurality of electrically operable power modules arranged in a row direction and at least in part having at least one control valve, said power modules being jointly connected with an electrical concatenation strand extending in the row direction, wherein via said concatenation strand control signals employed for the control of the power modules are communicated and wherein via said concatenation strand the power modules are supplied with a first operating voltage, said first operating voltage being able to be supplied by way of a base connection provided on a connection module and connected with the concatenation strand, wherein for feeding of at least one further operating voltage there is in addition to the connection module at least one feed module having an electrical feed connection, said feed module being included or being able to be included in the course of the concatenation strand at a position spaced from the connection module, said electrical feed connection being externally accessible when said power modules are jointly connected with said electrical concatenation strand, the concatenation strand possessing operating voltage conductors extending in the row direction, said conductors being interrupted as regards potential by the feed module, which is respectively included or able to be included, for the formation of mutually separate operating voltage zones.

* * * * *